United States Patent Office 3,649,459
Patented Mar. 14, 1972

3,649,459
MICROBIOLOGICAL OXIDATION OF
HYDROCARBONS
Bernard Wolnak, Highland Park, and Brian Andreen, South Holland, Ill., and Chin-Yung Wen, Morgantown, W. Va., assignors to Institute of Gas Technology
No Drawing. Continuation-in-part of application Ser. No. 547,042, May 2, 1966. This application Feb. 23, 1968, Ser. No. 707,424
Int. Cl. C12d 13/06; A23j 1/00
U.S. Cl. 195—96
13 Claims

ABSTRACT OF THE DISCLOSURE

The specification discloses a novel mixed culture of micro-organisms useful as a food supplement. Growth mediums, methane containing feeds therefor, and methods of isolation and fermentive propagation are also disclosed. The mixed culture is on deposit as ATCC 19,385.

FIELD

This invention relates to the microbiological oxidation of hydrocarbons, and particularly to such oxidation of gaseous hydrocarbons with a novel mixed culture of micro-organisms in a novel nutrient medium to produce useful products such as amino acids, proteins and vitamins useful as a food supplement. More specifically, the invention relates to the microbiological oxidation of methane and natural gas with a novel mixed culture of micro-organisms in a novel nutrient medium to produce cellular material rich in amino acids, proteins and vitamins and useful for example, as animal feed supplements. This application is a continuation-in-part of our copending application Ser. No. 547,042, filed May 2, 1966, now abandoned.

BACKGROUND

Micro-organisms are known to produce products of high utility and commercial value. These products find use in the pharmaceutical industry, and serve as valuable adjuncts in the food and feed industries. The type of product which we seek to produce by our invention covers a wide range of molecules. Briefly, we desired to produce products containing nutritionally important amino acids, e.g. lysine, methionine, and/or tryptophane. Various vitamins are also sought such as vitamin A and carotene $B_1$ (thiamine), $B_2$ (riboflavin), $B_6$ (pyridoxine), $B_{12}$, $D_1$, $D_2$, and $D_3$, and pantothenic and folic acid. The products we seek may be used as total cellular material and sold as dried food supplement. Alternatively, the valuable constituents of the product such as amino acids and vitamins may be isolated and sold.

It is well known in the art that hydrocarbons and more particularly methane can be oxidized by certain micro-organisms to produce a variety of products. As early as 1905 it was observed that methane seemed to be adsorbed by certain microbes. A year later there was reported isolation of a methane-utilizing bacterium from aquatic plant material cultured in a mineral salts media. Cultures of this aerobic bacterium, named Bacillus methanamonas and later renamed Methanomonas methanica (M. methanica), were characterized by increasing growth of the cells, disappearance of methane, and production of carbon dioxide. Following these initial discoveries, only isolated reports of the occurrence of methane-utilizing bacteria were made until recent years.

The first commercial application of methane-utilizing bacteria was in geomicrobiological prospecting for petroleum. In 1946 Taggart disclosed in U.S. Pat. 2,396,900 a process for the industrial fermentation of gaseous paraffinic hydrocarbons by bacteria to produce oxygenated organic compounds. Despite this early interest in commercial utilization of hydrocarbon fermentation, industrial processes using methane-utilizing bacteria have never gained acceptance, probably because of lack of knowledge concerning the growth characteristics of hydrocarbon utilizing bacteria and their products.

A number of workers have studied methane-utilizing bacteria in recent years. Unfortunately much of the data is only of limited value and the results are often conflicting because of poorly designed experiments and lack of quantitative data. This is particularly true when an attempt is made to classify the various methane-utilizing bacteria to the standards of modern systematics. Three methane utilizing bacteria, Mycobacterium flavum var. methanicum, Mycobacterium methanicum n. sp., and Pseudomonas methanica have been well defined and characterized and their use is described in the literature. See e.g. the article by Hutton and ZoBell reported in vol. 58, Journal of Bacteriology pp. 463–73 (1949) as well as the papers of Dworkin & Foster "Studies of Pseudomonas Methancia (Söhngen) Nov. Comb" J. Bacteriol 72 646–59 (1956) and Johnson & Temple "Some Aspects of Methane Oxidation" J. Bacteriol 84, 456–58 (1962).

THE INVENTION

We have discovered, isolated and characterized a mixed culture of micro-organisms which are capable of oxidizing methane and natural gas in a novel nutrient medium containing only inorganic salts to produce cellular material high in protein and vitamin content. The new mixed culture on microscopic examination is seen to contain a gram-negative rod about $0.5-3.0\mu$ wide and $2-10\mu$ long as the dominant organism, several smaller bacteria and an occasional yeast cell. The new mixed culture can be isolated from the plant Elodea or a soil sample by a technique hereinafter described. Our studies have shown that the new culture, when fed methane or natural gas in the novel nutrient medium, produces unexpectedly high yields of valuable proteins and vitamins as hereinafter set out in detail. The cellular material produced by our process can be used as a food and feed supplement and potentially could serve as food material for large percentages of the world's population. In addition, the cellular material is unexpectedly rich in valuable vitamins which can be isolated and sold in pure form or can be used as part of the cellular food supplement material.

It is thus an object of this invention to provide a mixed culture of micro-organisms and methods for its isolation and propagation by fermentation, which culture utilizes methane or natural gas to make cellular oxidation products containing proteins and vitamins which can be used as an animal or human food supplement.

It is another object of this invention to provide a technique using a novel nutrient medium which is substantially free of copper whereby a methane-utilizing micro-organism is cultured and isolated.

It is a further object of this invention to provide a process for producing cellular material rich in proteins and vitamins by feeding methane or natural gas to a novel culture of micro-organisms in a novel nutrient aqueous medium containing only inorganic salts.

It is another object of this invention to produce a novel cellular material by microbiological oxidation of hydrocarbon-containing gas having at least one percent by volume methane which material is rich in amino acids and vitamins, particularly vitmain $B_{12}$.

Other objects of the invention will become apparent as it is described hereinafter.

The objects of this invention are achieved by isolating, growing and utilizing a mixed micro organism culture from a soil sample or from the plant Elodea. The novel mixed culture of this invention has been deposited in the American Type Culture Collection as accession ATCC 19,385.

ATCC–19,385 is a mixed culture isolated from soil or the plant Elodea using standard isolation techniques, a defined mineral salts medium, and an atmosphere containing methane, oxygen, carbon dioxide, and nitrogen. ATCC–19,385 maintained in the prescribed manner contains a gram-negative rod about $0.5$–$3.0\mu$ wide and $2$–$10\mu$ long as the dominant organism, smaller bacteria, and yeast cells. Most of the organisms are motile and stain somewhat erratically with Gram stain, but are usually moderately gram-negative. ATCC–19,385 stains easily with saframine to give pink to red even staining. Cultures in the logarithmic phase of growth stain poorly with Sudan Black, indicating a low concentration of cellular fat. ATCC–19,385 will grow only in the presence of methane, but can utilize higher hydrocarbons when growing on methane. Oxygen can be supplied at high concentrations in the feed gas. Carbon dioxide is not essential for growth but is a preferred component of the feed gas. ATCC–19,385 can utilize various inorganic nitrogen sources. Growth occurs in the temperature range of 10° to 55° C. and a pH range of 5.0 to 8.0. Optimum growth occurs when the temperature is 20°–37° C. and the pH is 6.5–7.5. Addition of zinc or copper ions to the medium were not found beneficial to growth.

To isolate the culture, we use standard isolation techniques but employ a mineral salts nutrient medium which is substantially free of copper and zinc except for minor amounts as impurities in other salts. Cobalt in the medium is preferred, but is not essential to growth. A typical salts media used for isolation is shown in Table 1.

TABLE 1.—SALTS IN MEDIA (GMS./500 ML.)

| Salt | Grams | Micrograms |
| --- | --- | --- |
| $NaNO_3$ | 1.0 | 1,000,000 |
| $MgSO_4 \cdot 7H_2O$ | 0.1 | 100,000 |
| $K_2HPO_4$ | 0.045 | 45,000 |
| $CaSO_4$ | 0.01 | 10,000 |
| $FeSO_4 \cdot 7H_2O$ | 0.001 | 1,000 |
| $Na_2HPO_4$ | 0.0002 | 200 |
| $Co(NO_3)_2 \cdot 6H_2O$ | 0.0002 | 200 |
| $H_3BO_3$ | 0.0002 | 200 |
| $MnSO_4$ | 0.00004 | 40 |

A typical procedure for isolating the organism is as follows: To each of several sterile 250 ml. Erlenmeyer flasks is added 50 ml. of sterile basic salts medium as described in Table 1, but being substantially free of copper and zinc. To the media in each of several flasks is then added small protions, e.g. 0.5 g. of samples of the plant Elodea. When using the plant, the whole plant is used. To several additional flasks is added 0.5–1.0 g. samples of soil. The soil used may be from any location, soils in urban areas being particularly useful since methane is a contaminant of the air in certain areas and the culture is more likely to be available. The contents of the flask are mixed and the medium and flask volume saturated with gas mixture containing methane by the submerged fermentation technique, hereinafter more fully described. After stoppering tightly, the flasks are incubated at 30–35° C. and shaken from time to time, the gas mixture being renewed at biweekly intervals. Ordinarily, evidence of growth of a culture appears in three to six weeks, at which time the growing culture is transferred to new media.

A new set of sterile flasks containing 50 ml. of sterile media is prepared. The original flasks containing the growing culture are shaken well and about 2.0 ml. of the suspension from each of the original flasks is transferred to a new flask. After mixing, the new flasks are incubated at 30–35° C. after saturating with the standard gas mixture. As before the flasks are shaken at intervals and regassed at intervals, approximately 2–3 times per week. Ordinarily growth appears in these flasks after 2–4 weeks. At this time the growing culture is transferred to a shake flask or an agar plate.

If transferred to a shake flask, the following process is used. To a sterile 500 ml. flask is added 100 ml. of sterile media. A 10–25 ml. sample of culture growing in the previous flask is transferred to the new media, the contents gassed, and the stoppered flask placed on a New Brunswick reciprocating shaker. After gassing, daily growth is apparent in 3–7 days, at which time the particular sample is ready for transfer to sparged flasks for further growth.

Occasionally it is desirable to go from the first or second growth flasks to an agar plate by the following process. Agar plates using the basic sterile medium are prepared and streaked with the Elodea or soil organisms using standard bacteriological techniques. These plates are left uncovered in a renewed gas atmosphere inside a gas-tight desiccator. After 2–4 weeks, small white or yellowish colonies become apparent. One or more of these colonies are then transferred to a shake flask as described above.

Purity of the culture is determined by careful microscopic examination using conventional staining techniques.

A growing culture as isolated and described above is used to inoculate the nutrient medium for growth of cellular material. As illustrative of the use of the culture to produce useful cellular material, we have standardized our procedure wherein 450 ml. of the nutrient medium, as shown in Table 1, is placed in specially constructed Erlenmeyer flasks fitted with a sparger to introduce the gas mixture into this media as small bubbles by the submerged fermentation technique. The medium is sterilized by boiling and cooling; the glass apparatus is sterilized by dry heat and cooled. The sterile medium is then transferred to the sterile flask and inoculated with 50 ml. of a growing culture. This culture is maintained by keeping it supplied with nutrient medium and gas. Maintenance cultures are supplied with gas through the spargers, or are continually gassed to maintain a saturated solution and atmosphere in the liquid phase.

Following addition of the medium, the apparatus is placed on a gyratory shaking device and the gas flow started. The feed may contain various hydrocarbons, as liquids or solids as well as gases, as long as there is present about 1% by volume methane. Hydrocarbons such as ethane and propane may be present and the culture will utilize such hydrocarbons in the presence of methane. Preferably, the feed may usefully contain any hydrocarbon which is gaseous at the operating conditions of the fermentation.

A typical feed gas mixture consists of natural gas or purified methane, carbon dioxide, oxygen, and nitrogen. The natural gas used in our experiments, assayed by mass spectrometer, had the following composition:

| | Percent |
| --- | --- |
| Nitrogen | 4.01 |
| Carbon dioxide | 0.09 |
| Helium | 0.23 |
| Propane | 0.45 |
| Ethane | 4.67 |
| Methane | 90.55 |
| | 100.00 |

We have found that growth rate is essentially the same using either pure methane or natural gas.

On the basis of using 450 ml. of medium and 50 ml. of inoculum, which has about the same concentration of salts, the final 500 ml. of inoculated medium contains the amount of salts as shown in Table 1.

In the medium constituted as shown in Table 1, the culture obtains its carbon requirements from the methane and ethane, its nitrogen from the sodium nitrate, its phosphorus from the added phosphates, oxygen from the oxygen gas and/or nitrate ion, and its sulfur from the sulfate ion. The remaining salts supply such other metal ions as may be required (in small amounts) to form important enzymes, coenzymes, and growth factors.

In our work, we have used optical density as a measure of the growth of the cells and have reasonably assumed that when a reading of 2.0 was obtained, the fermentation was complete. While often up to 340 hours reaction time was required to obtain complete fermentation, we found that under optimum conditions, only 96 to 120 hours were required. Typical products obtained by using the culture and process of the invention have the average composition shown in the following Tables 2 to 4 as drawn from the samples given in the examples herein:

Table 2

| Composition: | Percent by weight (dry basis) |
|---|---|
| Total N | 8.24 |
| Non Protein N | 2.8 |
| Protein N | 5.44 |
| Fat | 4.0 |
| Ash | 2.6 |
| Protein (N×6.25%) | 34.0 |
| Carbohydrate (calculated) | 59.4 |

*Solids content of cells as isolated equals 5.2%.

Table 3

| Vitamins: | Micrograms/gram (dry basis) |
|---|---|
| $B_1$ (Thiamine) | 19 |
| $B_2$ (Riboflavin) | 50 |
| $B_6$ (Pyridoxine) | 165 |
| B-12 | 10 |
| Niacin | 180 |
| Pantothenic acid | 26 |
| Choline | 10,000 |
| Carotene | 0 |
| Xanthophyll | 2 |

Table 4

| Amino acids: | Percent by weight (dry basis) |
|---|---|
| Tryptophane | 1.15 |
| Lysine | 3.15 |
| Histidine | 1.29 |
| Methionine | 0.90 |
| Leucine | 9.06 |
| Glutamic acid | 4.80 |

As previously noted, it is preferred that the feed gas contains at least one percent methane, oxygen and nitrogen. Operable concentrations are:

This high oxygen tolerance is unexpected since previous published results generally indicated that oxygen concentrations above 21% are toxic to several species of methane-consuming cultures. The function of the added $CO_2$ is not fully understood, but it may act as a "primer." The nitrogen component is added to take care of the possibility that the organism will fix nitrogen, and in conjunction with $O_2$ to shows the performance with an air-natural gas or air-methane-containing gas feed.

In order to find preferred conditions for operation to accelerate cell growth, we have made a series of runs. We have found that prior gasification of the media and that sterilization of the media are not essential to good growth rates but that the combination of sterilizing and pre-gassing gives better growth rates than omitting one or both of these steps. Further, the addition of amino acids such as DL-alanine and DL-phenylalanine does not significantly affect growth rate. Still further the use of various ammonium salts as nitrogen containing salts in addition to or in place of sodium nitrate did not appear to improve growth rates.

The operating temperature of fermentation may be from 10° C. to 70° C., the preferred range being 20° to 37° C. We have found that changes in temperature over the range 20° C. to 37° C. have little effect on growth rate. pH may be from 5.0 to 8.0 with 6.5 to 7.5 being optimum.

With respect to the medium used, we have conducted screening tests to evaulate the need for several of the ions found in the media. Tables 5 to 8 show results of such screening tests. In short, we found that phosphate and sulfate ions are essential. In addition, our tests show that copper ions inhibit cell growth, while cobalt and zinc ions are not essential for good growth rate, but cobalt may be added.

In the first experiment in this series, shown in Table 5, the effect of adding small amounts of $Zn(NO_3)_2 \cdot 6H_2O$ (zinc nitrate), $Co(NO_3)_2 \cdot 6H_2O$ (cobalt nitrate, and $CuSO_4 \cdot 5H_2O$ (copper sulfate) to the basic medium was determined. These media were prepared by taking 450 ml. of the standard medium, adding to it 1.0 or 2.0 ml. of a 1.0 percent solution of each of these salts, and inoculating it with 50 ml. of a growing culture of the methane-fermenting organism. This procedure resulted in a final concentration of 10 or 20 mg. of the salt per 500 ml. of medium. The flow rate of the mixture of gases (40 percent natural gas, 40 percent oxygen, 5 percent carbon dioxide, and 15 percent nitrogen) was maintained at 50 ml. per minute. The rate of growth was determined by measuring the optical density of the culture at 400 m$\mu$ at various times. The results are presented in Table 5.

TABLE 5.—EFFORT OF CATION ADDITION ON GROWTH RATE

| Sample | Salt | Amount added, mg. | Optical density at 400 m$\mu$, hours | | | | |
|---|---|---|---|---|---|---|---|
| | | | 0 | 24 | 48 | 96 | 120 |
| A | None [1] | 0 | 0.191 | 0.420 | 0.903 | 2.00 | 2.00 |
| B | do | 0 | 0.194 | 0.444 | 0.939 | 2.00 | 2.00 |
| C | $Zn(NO_3) \cdot 6H_2O$ | 10 | 0.201 | 0.362 | 1.046 | 2.00 | 2.00 |
| D | $Zn(NO_3)_2 \cdot 6H_2O$ | 20 | 0.218 | 0.398 | 0.757 | 1.53 | 2.00 |
| E | $Co(NO_3)_2 \cdot 6H_2O$ | 10 | 0.201 | 0.444 | 0.796 | 0.53 | 2.00 |
| F | $Co(NO_3)_2 \cdot 6H_2O$ | 20 | 0.201 | 0.377 | 0.602 | 1.40 | 2.00 |
| G | $CuSO_4 \cdot 5H_2O$ | 10 | 0.218 | 0.237 | 0.244 | 0.276 | 0.268 |
| H | $CuSO_4 \cdot 5H_2O$ | 20 | 0.233 | 0.240 | 0.248 | 0.260 | 0.268 |

[1] Controls

| Feed gas: | Percent by volume |
|---|---|
| $CH_4$ | 40 |
| $O_2$ | 40 |
| $N_2$ | 15 |
| $CO_2$ | 5 |
| Total | 100 |

The control group in this run grew at an extremely rapid rate. In these tests, apparently the additions of zinc and cobalt salts at 20 $\mu$g. level may be slightly inhibiting but added tests (Table 8 below) show this effect for cobalt not clearly established. Most prominent, however, was the pronounced toxic effect of small traces of copper sulfate. The results indicate that these amounts of cupric ion completely prevented the growth of the organism. The difference in optical density at the start and after 120 hours was very small. Since there was some slight growth, it appears that the copper is bacteriostatic rather than bacteriocidal; i.e., it prevents the growth of the organism but does not kill it.

Since the control group grew so rapidly, the effect of adding these ions to the basic medium was studied in greater detail to determine whether the results could be checked. Because an ion which is toxic in relatively high concentrations can be stimulating in lower ones, a range of concentrations for each of these cations was studied.

In one experiment, the amount of copper sulfate ($CuSO_4 \cdot 5H_2O$) used varied from a high of 100 μg. to a low of 5 μg. of the salt added to 500 ml. of the fermenting medium (prepared from 450 ml. of basic medium plus 50 ml., of culture). The flow rate of the basic gas mixture was kept at 50 ml., per minute. The results are shown in Table 6.

TABLE 6.—EFFECT OF COPPER SULFATE ADDITIONS ON GROWTH RATE

| Sample | Salt added, μg. | Optical density at 400 mμ, hours | | | | | |
|---|---|---|---|---|---|---|---|
| | | 0 | 24 | 48 | 68 | 81 | 108 |
| A | [1]0 | 0.180 | 0.382 | 0.912 | 1.260 | 1.602 | 2.00 |
| B | [1]0 | 0.180 | 0.409 | 0.921 | 1.347 | 1.70 | 2.00 |
| C | 5 | 0.180 | 0.337 | 0.757 | 1.11 | 1.456 | 2.00 |
| D | 10 | 0.180 | 0.409 | 0.939 | 1.260 | 1.523 | 2.00 |
| E | 25 | 0.184 | 0.310 | 0.538 | 1.10 | 1.187 | 2.00 |
| F | 50 | 0.180 | 0.240 | 0.323 | 0.469 | 0.585 | .75 |
| G | 75 | 0.191 | 0.226 | 0.344 | 0.432 | 0.530 | |
| H | 100 | 0.191 | 0.244 | 0.343 | 0.240 | 0.208 | |

[1] Controls.

Apparently, this culture does not require greater amounts of cupric ions than are present as contaminants in the salts and water used to make up the medium. Additions of $CuSO_4 \cdot 5H_2O$ as low as 5 μg. per 500 ml. of medium (equivalent to 0.01 μg. of the salt or 0.0025 μg. of the ion per ml.) appear to slightly inhibit the growth rate, while an increase to five times this level (0.125 μg. of the ion per ml. of medium) appears to be definitely inhibiting.

Our attention turned to the effect of zinc additions on the growth rate. Using the same procedure as in the copper sulfate experiment, we added $Zn(NO_3)_2 \cdot 6H_2O$ in amounts ranging from 2.5 to 20 μg. per 500 ml. of medium. The flow rate was maintained at 50 ml. per minute with the same gas concentrations at ambient temperature. The inoculum was 50 ml. of culture. The results are given in Table 7.

TABLE 7.—EFFECT ON ZINC NITRATE ADDITIONS ON GROWTH RATE

| Sample | Salt added, μg. | Optical density at 400 mμ, hours | | | | |
|---|---|---|---|---|---|---|
| | | 0 | 24 | 48 | 96 | 120 |
| A | [1]0 | 0.187 | 0.367 | 0.959 | 2.00 | 2.00 |
| B | [1]0 | 0.187 | 0.509 | 1.00 | 2.00 | 2.00 |
| C | 2.5 | 0.187 | 0.438 | 0.824 | 1.82 | 2.00 |
| D | 5.0 | 0.177 | 0.377 | 0.538 | 1.52 | 2.00 |
| E | 7.5 | 0.191 | 0.328 | 0.538 | 1.35 | 1.82 |
| F | 10 | 0.191 | 0.337 | 0.668 | 1.67 | 2.00 |
| G | 15 | 0.197 | 0.337 | 0.757 | 1.67 | 2.00 |
| H | 20 | 0.211 | 0.362 | 0.757 | 1.67 | 2.00 |

[1] Controls.

These results indicate that zinc ions, like cupric ions, have no beneficial effect; evidently there are sufficient zinc ions as contaminants in the other metallic salts and in the water. However, in contrast to the cupric ion, an increase in the amount of zinc ions appears to have little or no effect on the growth rate.

The next experiment was directed toward determining the effect of adding small amounts of cobalt ions as $$Co(NO_3)_2 \cdot 6H_2O$$

to the medium. The procedure was the same as that used in the other experiments. The amounts of salt added ranged from 5 to 100 μg. per 500 ml. of medium. Inoculation was with 50 ml. of culture in 450 ml. of standard medium. The flow rate of the standard gas mixture was 50 ml. per minute at ambient temperature. The results are given in Table 8.

TABLE 8.—EFFECT OF COBALT NITRATE ADDITIONS ON GROWTH RATE

| Sample | Salt added, μg. | Optical density at 400 mμ, hours | | | | | |
|---|---|---|---|---|---|---|---|
| | | 0 | 24 | 48 | 72 | 96 | 120 |
| A | [1]0 | 0.173 | 0.297 | 0.561 | 0.93 | 1.60 | 2.00 |
| B | [1]0 | 0.171 | 0.347 | 0.733 | 1.301 | 1.82 | 2.00 |
| C | 5 | 0.168 | 0.347 | 0.770 | 1.398 | 2.00 | 2.00 |
| D | 10 | 0.177 | 0.337 | 0.80 | 1.456 | 2.00 | 2.00 |
| E | 25 | 0.161 | 0.357 | 0.796 | 1.40 | 2.00 | 2.00 |
| F | 50 | 0.161 | 0.372 | 0.796 | 1.347 | 2.00 | 2.00 |
| G | 75 | 0.161 | 0.319 | 0.757 | 1.456 | 2.00 | 2.00 |
| H | 100 | 0.168 | 0.301 | 0.678 | 1.222 | 1.82 | 2.00 |

[1] Controls.

Despite the fact that the control fermentation was quite rapid, being completed in about 110 to 115 hours, the flasks containing 5 to 75 μg. of salt showed a significant improvement, completing fermentation in 85 to 90 hours. The growth rate in the flask containing 100 μg. of salt was somewhat slower, closely paralleling that of the control flasks.

On the basis of this and subsequent experiments, we find that cobalt is not required but that 50 μg. of cobalt nitrate per 500 ml. provides a good cobalt ion concentration for the basic media. Vitamin $B_{12}$ content of the cells may be a function of added cobalt.

We have also run tests to determine the effect on cell growth rate of varying gas flow rates particularly to see if the growth rates could be significantly reduced. The flow rate was varied from 10 to 50 ml. per minute, and we found that good growth rates were obtained at 10 ml. per minute. The following Table 9 shows runs using 25 ml. of inoculant with 475 ml. of nutrient medium which was neither sterilized nor pre-gassed. Optical density was measured as the quantitative indication of cell growth.

TABLE 9.—EFFECT OF VARYING FLOW RATE ON FERMENTATION RATE

| Sample | Flow rate, ml./min. | 0 | 24 | 48 | 72 | 96 | 114 |
|---|---|---|---|---|---|---|---|
| 1 | 10 | 0.36 | 0.54 | 0.96 | 1.40 | 1.70 | 1.82 |
| 2 | 10 | 0.36 | 0.54 | 0.92 | 1.35 | 1.60 | 1.82 |
| 3 | 20 | 0.36 | 0.54 | 0.94 | 1.30 | 1.70 | 1.82 |
| 4 | 20 | 0.37 | 0.54 | 0.92 | 1.30 | 1.70 | 1.82 |
| 5 | 30 | 0.36 | 0.54 | 0.92 | 1.30 | 1.60 | 1.82 |
| 6 | 30 | 0.36 | 0.54 | 0.92 | 1.35 | 1.70 | 1.82 |
| 7 | 50 | 0.36 | 0.52 | 0.89 | 1.26 | 1.60 | 1.82 |
| 8 | 50 | 0.36 | 0.52 | 0.89 | 1.30 | 1.60 | 1.82 |

The following non-limiting examples illustrate the inventon:

EXAMPLE 1

The mixed culture hereinabove described was isolated by the technique described above. Two runs, each of 50 ml. of the growing culture was added to 450 ml. of the medium shown in Table 1 and contacted with gas containing 40% by volume natural gas, 40% oxygen, 5% carbon dioxide and 15% nitrogen. Gas flow rate was maintained at 50 ml./minute for about 120 hours. The temperature was maintained at 23 to 25° C., the pH 6.8 to 7.2. The cells obtained from the runs were isolated by centrifugation in a Lourdes centrifuge at 10,000 r.p.m. for 20–30 minutes. The cells from the two runs were combined to provide a single sample. The average of the gross analysis of the cell composition of this sample and that of Example 2 is presented above in Table 2.

The protein content is somewhat lower than expected in a cell of this type, but this may be due to the presence of nitrate ion in the moisture retained on the surface of the cell or to the fact that the 6.25 factor may be too low.

The fat content is also low but not inordinately so. Samples of the cells were stained to determine some of the characteristics of the fat in them. On a qualitative basis, the cells have a low fat content.

The ash content was surprisingly low considering the fact that the organism was grown in a high ash-content medium.

A further analysis of the cells for six amino acids showed the following:

| Amino acid: | Percent present in cells on dry basis |
|---|---|
| Tryptophane | 1.08 |
| Lysine | 3.30 |
| Histidine | 1.42 |
| Methionine | 0.91 |
| Leucine | 9.12 |
| Glutamic acid | 5.15 |

Analysis for vitamins showed the following:

| Vitamin: | Micrograms/grams (dry basis) |
|---|---|
| Thiamin (vitamin $B_1$) | 20.7 |
| Riboflavin (vitamin $B_2$) | 47.4 |
| Niacin | 221.0 |
| Pantothenic acid | 31.1 |
| Choline | 9150.0 |
| Pyridoxin (vitamin $B_6$) | 168.7 |
| Cobalamin (vitamin $B_{12}$) | 9.7 |
| Carotene | 0.0 |
| Xanthophyll | 0.9 |

EXAMPLE 2

Two runs were made as in Example 1 except that the flow rate of gas was reduced to 10 to 30 mls. per minute. Gross analysis was averaged with that for Example 1 and is presented in Table 2.

A further analysis of the cells for six amino acids showed the following:

| Amino acid: | Percent present in cells on dry basis |
|---|---|
| Tryptophane | 1.22 |
| Lysine | 3.00 |
| Histidine | 1.16 |
| Methionine | 0.90 |
| Leucine | 9.00 |
| Glutamic acid | 4.50 |

Analysis for vitamins showed the following:

| Vitamin: | Micrograms/grams (dry basis) |
|---|---|
| Thiamin (vitamin $B_1$) | 18.7 |
| Riboflavin (vitamin $B_2$) | 55.2 |
| Niacin | 131.2 |
| Pantothenic acid | 21.6 |
| Choline | 12170.0 |
| Pyridoxin (vitamin $B_6$) | 148.0 |
| Cobalamin (vitamin $B_{12}$) | 11.5 |
| Carotene | 0.0 |
| Xanthophyll | 3.7 |

Having described our invention, we claim:

1. Process for making a cellular product useful as a food supplement comprising (1) inoculating an aqueous nutrient medium comprising essentially inorganic salts with a mixed culture consisting of micro-organisms (ATCC 19,385), said medium being substantially free of copper, and (2) contacting the medium and organism mixture with a feed gas containing methane and oxygen whereby said culture propagates by fermentation to a cellular product.

2. Process of claim 1 wherein said feed comprises natural gas and oxygen.

3. Process of claim 1 wherein said feed comprises methane, oxygen and nitrogen, but is substantially free of carbon dioxide.

4. Process of claim 2 wherein said feed comprises about 40% by volume natural gas, 5% by volume carbon dioxide, 40% by volume oxygen and 15% by volume nitrogen.

5. Process of claim 1 including the added step of recovering a cellular product rich in proteins.

6. Process of claim 1 including the added step of recovering a cellular product rich in one or more amino acids selected from the group consisting of tryptophane, lysine, histidine, methionine, leucine and glutamic acid.

7. Process of claim 1 including the added step of recovering a product rich in vitamins selected from the group consisting of $B_{12}$, $B_6$, choline, niacin, $B_2$, $B_1$ and pantothenic acid.

8. Process of claim 1 wherein said culture is isolated from a soil sample or the plant Elodea.

9. Process of claim 1 wherein the pH of said medium is about 5.0 to 8.0.

10. Process of claim 1 wherein the temperature of said medium is between about 10° C. and 70° C.

11. Process of claim 10 wherein said temperature is between 20° C. and 37° C.

12. Process of claim 1 wherein said medium contains cobalt ions in concentration of about to 1,000 micrograms per 500 ml. of medium.

13. Process of claim 12 wherein said concentration is between 50 and 100 micrograms per 500 ml. of medium.

References Cited

UNITED STATES PATENTS

| 3,308,035 | 3/1967 | Douros | 195—28 |
| 3,384,491 | 5/1968 | Guenther et al. | 99—9 |
| 3,355,296 | 11/1967 | Perkins et al. | 99—14 |

LIONEL M. SHAPIRO, Primary Examiner

U.S. Cl. X.R.

195—3 H, 111; 99—14